Nov. 29, 1949   C. YOUNG   2,489,995
PUNCTURE-PROOF SELF-SEALING PNEUMATIC TIRE
Filed Nov. 27, 1944
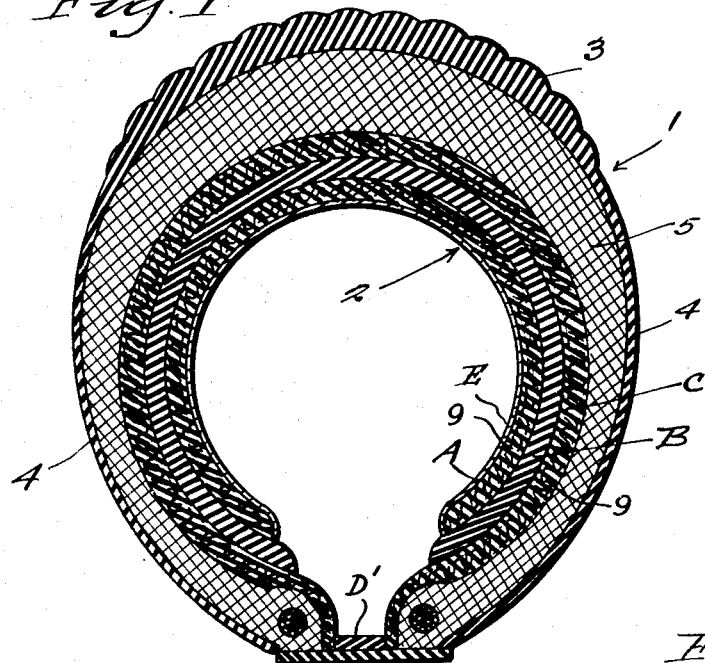
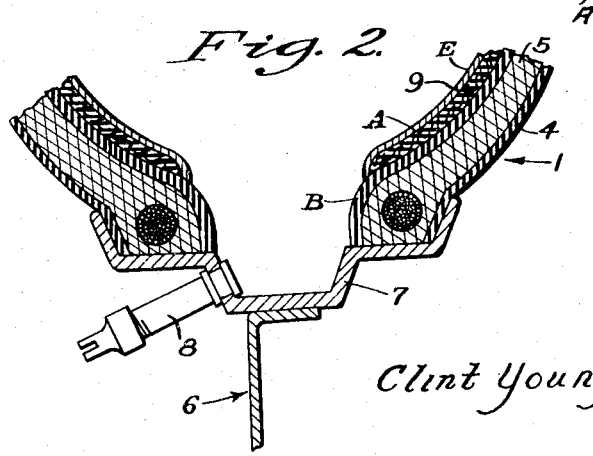
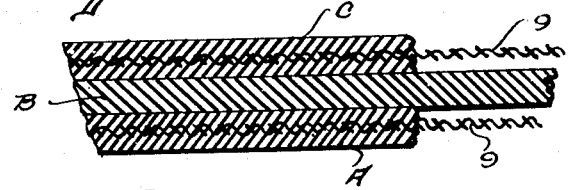
Inventor
Clint Young,
By *Clarence A. O'Brien
and Harvey B. Jacobson*
Attorneys Patented Nov. 29, 1949

2,489,995

UNITED STATES PATENT OFFICE 2,489,995

PUNCTURE-PROOF SELF-SEALING
PNEUMATIC TIRE

Clint Young, East St. Louis, Ill.

Application November 27, 1944, Serial No. 565,357

2 Claims. (Cl. 152—347)

This invention relates to certain novel, useful and feasible improvements and refinements characterizing what is believed to be a practicable and reliable puncture-proof, self-sealing pneumatic tire or casing of a so-called tubeless type.

The tire to be hereinafter specifically described constitutes what is believed to be an innovation in this line of endeavor, the same obviating the use of the regular or ordinary inner tube and being of such construction as to be substantially free from punctures, pinches and ordinary leaks such as occur in conventional or regular tires employing standard types of inner tubes.

The principal object of my invention is to make the tread portion of the casing self-sealing or self-healing when pierced by nails or other objects. The main idea is that the hole made by such objects will be sealed up completely, thus preventing any air leaking from the inside to the outside and also preventing any water or moisture from penetrating from the outside to the inside of the casing.

I have found that ordinary uncured sealing compounds which are now available if calendered into a desired sheet form are entirely too stiff and defeat the purpose of being self-sealing. And I have also found that an application of extra soft sticky composition will become softer while in use when the tire gets hot. Then, it becomes misplaced by slipping or rolling and becomes ineffective, thus defeating its intended purpose. So, it is another objective to overcome these and other major defects with novel means that can be easily handled and applied and which will "stay put" in order to do the work most effectively.

In carrying out the principles of the invention, I have evolved and produced a tire of requisite buoyancy and weight rendering it adaptable for use on automobiles, trucks, tractors, motorcycles and the like, the same being possessed of simplicity, expediency of manufacture and other factors which render it aptly fitted for the intended purposes.

Many other features and advantages will become more readily apparent from the following description and the accompanying illustrative drawings.

In the drawings, wherein like numerals are employed to designate like elements and parts throughout the views:

Figure 1 is a cross-section through a tubeless pneumatic tubular tire constructed in accordance with the principles of this invention.

Figure 2 is a fragmentary detailed section showing a modification, the inner perimeter seal being omitted and the side walls of the casing being secured by adhesion to the flanges of a rim.

Figure 3 is a fragmentary longitudinal sectional view, on an exaggerated scale, of the triple ply lining with the self-sealing laminations or layers reinforced by loose woven fabric embedded therein.

Although the constructions shown in figures are representative modifications, the basic principles are the same and therefore corresponding reference numerals and reference letters are employed to designate like parts.

In the drawings (Figure 1) the outer casing is denoted by the numeral 1 and is the same in construction as any conventional casing in that it includes a suitable tread 3 having appropriately thinned side walls 4, these parts of customary rubber built on the customarily fabricated carcass or foundation 5. The puncture-proofing and self-sealing interior means, this of laminated form, is denoted generally, by the reference numeral 2.

To attain the very best results possible I propose a new and novel method of construction in the building of the casings before they are put into the molds to be cured or vulcanized, and believe that if they are constructed in this manner the desired results will be assured, and a cross-sectional view of the finished casing is hereby submitted and shown as Figure 1.

This cross section shows three laminations or layers A, B and C are added to the inner surface of the carcass. During the process of building the casings on the building forms these three layers should be built in just like any other internal part, and be placed in such a manner that they will be on the inner part of the casing after it is molded or vulcanized.

The nature of these three laminations A, B and C, and their relative positions to each other constitute the secret of success and the essence of this invention. Also, the mode of operation remains the same whether they are built into the casing, as it is being built; or, added to it after the casing is completly vulcanized.

Lamination B, the center one of the three, will do the job of constraining the air in the casing, and it should be made out of any good first class inner tube stock, irrespective of color and ingredients, except that the composition must have the necessary ingredients to cause it to become cured or vulcanized properly as the casing is vulcanized. In the finished tire the layer or ply B will be regular vulcanized rubber, similar to that employed in the ordinary inner tube.

Laminations A and C, which form the "inner" and "outer" layers, relative to layer B, should each be puncture sealant compounds, more specifically, each should be a layer of prepared sheet form embodying mill-mixed, masticated, non-vulcanizable, self-healing rubber compound of predetermined plastic, adhesive and puncture-sealing properties that will go through the vulcanizing process and still come out the same sticky uncured composition. This feature or phase of employing self-sealing compositions on both sides of the cured rubber in vulcanized layer B is one of the chief accomplishments in this invention. And, it is the double action step of sealing from one to the other as an object penetrates them, that will afford the very best results obtainable.

To add to the certainty for sealing I deem it proper to stress that laminations A and C be soft, highly pliable and exceptionally sticky non-vulcanizable rubber. And, to strengthen these laminations I recommend that both be partially fabricated, that is, pressed onto a fabric foundation 6 of very loose weave, similar to fish netting or the commonly used open-work bagging material used for fruits and vegetables this of net-like nature and if desired made of paper. The purpose of this netted fabric or webbing material is three-fold. First, it adds strength to the composition and reinforces same "B" on both sides. Second, it serves to maintain the soft sticky compositions A and C in their proper places at all times thus preventing slipping or rolling. Third, it makes easier the handling and processing of this soft sticky composition into the desired layer or ply. Hence, it is possible to make the self-sealing compositions just as soft and gum-like as desired. I find that it will be necessary, as a general proposition, to use a very thin layer of non-vulcanizable non-sticky rubber composition, about the thickness of writing paper, the same being adhesively fastened to the inward surface of the innermost lamination and serving to face and finish off said surface and being denoted in the drawings by the reference character E.

Similar examples of compounded sealants, so-called, are evident in patents to Loomis 2,055,797 of September 29, 1936 and Taylor 2,120,379 of June 14, 1938.

With a casing built in this manner; that is, with self-sealing compositions on both sides of the vulcanized rubber B; here is what takes place when it is penetrated by a nail or other object. As the object passes through layer C, a portion of the soft sticky composition adheres to the object and passes on through layer B, the vulcanized layer and joins with the composition in layer A, which is of a similar sticky composition, thus sealing the hole made in layer B. And as the object would be pulled out then a portion of the composition in layer A would follow through and join with the sticky composition in layer C, to give it a double seal effect for layer B. And in addition to this, a small portion of this double seal composition would follow through to the outside and help seal the hole made in the outer wall of the casing, thus closing the entire hole.

To complete the casing into a one piece tire the rim side must be sealed up and this can be done after the casing is molded, by attaching or vulcanizing strips, designated as D and D', to the inside beads of the casing. And the valve (not shown) could be conveniently placed in this part and applied at the same time. Strip D should be fabricated vulcanized rubber coated on the inside with layer D' of cured rubber as used in B.

I have found it absolutely necessary to have the soft uncured self-sealing composition on the innermost part of the casing and nothing vulcanized within it, because the thinnest kind of a strip of cured rubber will pull against the sealing compound and keep it from sealing.

It is believed that a mold could be developed wherein the casing part and the inside flap to cover the beads could all be cured and molded together at the same time, and eliminate the necessity for the thin inner non-sticky substance.

Reference is had now to Figure 2, showing a modification in which 6 designates a wheel having a marginal rim 7 this provided with a drop center having a tire valve 8 for convenient inflation of the tire. The tire is basically the same as that shown in Figure 1 except the bottom or basal seals D and D' are omitted and the beads of the tire are secured by glue or other adhesive material to the flanges of the rim to provide the desired airproof connection between the parts.

The main features of my invention are:

First, to build into a tubular tire or tire casing, or to apply to and face the inside of the casing with three layers or plies of compositions designated as A, B and C.

Second, to have layer B made of regular vulcanized rubber and shielded and supported on both sides or surfaces by layers of uncured as well as non-vulcanizable, sticky, self-sealing, plastic compounds designated as A and C.

Third, to have layer A, the inside layer of the self-sealing composition, to be coated with a thin stretch of a non-curable, and non-sticky composition, designated as E.

Fourth, to have layers A and C fabricated or pressed onto a fabric of a very loose weave. The purpose of the fabric is to render each layer or lamination uniform in thickness, to make it easier to handle and to make it non-ambulant.

The essence or gist of the invention is to produce a double sealing effect on any hole that might occur in the vulcanized rubber in layer B, by having it shielded, protected and supported on both sides by layers of non-vulcanizable, sticky, self-sealing rubber compound with reinforcing fabric extending commensurate with the extent of the compound itself.

Recapitulating, the three distinct features of the open weave fabric are: First, it serves as a conveyor for the soft sticky composition from the calender to the finished product. Second, it makes it possible that strips that are cut off of the fabric-composition sheet will have stretching qualities to be able to conform to the stretching of the carcass before and while being molded. Third, it serves as a retainer and binder to the composition to hold it in place that it may serve its purpose. Thus, I claim to have overcome two of the greatest and most serious difficulties that have been encountered in the building of an air chamber of the self-sealing type; namely, the handling of the soft sticky composition and application of same, and keeping the soft composition in its proper place without its slipping, sliding, rolling, etc. and becoming totally ineffective.

Briefly summarized, novelty has to do with a tubeless tire casing of conventional type equipped with my improved laminated lining means as well as with the means per se built into a tubular tire, or construed as a puncture proof lining for any tubular tire member. In either event, novelty is predicated on the combination of an inner lamination, an intervening lamination, an outer lamination attached to the inner surface of a carcass or the like, the intervening lamination being made up of vulcanizable inner tube stock and said inner and outer laminations each being prepared in sheet form and comprising a layer of non-vulcanizable self-healant rubber compound either of a specific mill-mixed masticated kind or prepared in accordance with the disclosures in the aforementioned prior patents. The rubber compound, however, must be of satisfactory plastic, adhesive and puncture sealing properties and, in compliance with the invention must have a ply of loose woven fabric embedded therein and ranging throughout its entire extent to render the laminations substantially non-ambulant and susceptible of handling.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. A pneumatic tire of the class shown and described comprising a casing embodying a rubber-covered fabric-reinforced carcass defining an inflatable and deflatable air chamber, and laminated means lining the principal inner surfaces of the walls of said air chamber, said means including, an outer lamination adhesively attached to the inner surface of said carcass, an inner lamination, and an intervening lamination, the latter lamination being made up of vulcanizable inner tube stock, said inner and outer laminations each being in prepared sheet form and comprising a layer of non-vulcanizable self-healing rubber compound of predetermined plastic, adhesive, and puncture-sealing properties having a ply of loose woven fabric embedded therein and ranging throughout its entire extent to render the lamination substantially non-ambulant and susceptible of handling, and a thin pliable covering of non-sticky rubber, the latter being fastened to the inward surface of the inner lamination and serving to face and finish off said surface.

2. A tubular tire member providing an air chamber, and a puncture-proof lining means secured to the inner wall of said chamber, said lining means comprising an outer lamination attached to inner surfaces of said tire member, an inner lamination, and an intervening lamination, the latter lamination being made up of vulcanizable inner tube stock, said inner and outer laminations each being in prepared sheet form and comprising a layer of non-vulcanizable self-healing rubber compound of predetermined plastic, adhesive, and puncture sealing properties having a ply of loose woven fabric embedded therein and ranging throughout its entire extent to render the lamination substantially non-ambulant and susceptible of handling, and a thin pliable covering of non-sticky rubber, the latter being fastened to the inward surface of the inner lamination and serving to face and finish off said surface.

CLINT YOUNG.

REFERENCES CITED

The following references are of record in the file of this patent:

UNITED STATES PATENTS

| Number | Name | Date |
|---|---|---|
| 496,527 | Morris | May 2, 1893 |
| 1,067,558 | Steinberg | July 15, 1913 |
| 1,398,482 | Allyn | Nov. 29, 1921 |
| 1,466,891 | Dishrow | Sept. 4, 1923 |
| 1,551,460 | Block | Aug. 25, 1925 |
| 1,575,509 | Schwab | Mar. 2, 1926 |
| 2,120,379 | Taylor | June 14, 1938 |

FOREIGN PATENTS

| Number | Country | Date |
|---|---|---|
| 25,651 | Great Britain | 1897 |
| 329,955 | Great Britain | 1930 |
| 612,524 | France | 1926 |
| 625,334 | Germany | 1936 |